United States Patent Office 3,608,181
Patented Sept. 28, 1971

3,608,181
FABRICATION OF PANEL WALLS
Nicholas G. Popov, Darien, Conn., assignor to The Babcock & Wilcox Company, New York, N.Y.
Filed Nov. 18, 1969, Ser. No. 877,714
Int. Cl. B23k 31/02
U.S. Cl. 29—472.1
4 Claims

ABSTRACT OF THE DISCLOSURE

A method of joining two tube panels each including parallel, laterally adjacent tubes having their intertube spaces closed by metallic webs comprising, providing at one end of one of the tube panels notches in the webs extending to the associated tube ends, positioning the notched end of the panel in abutting planar relationship with the second panel so that corresponding tubes of the panels are in coaxial relation and corresponding webs are in opposing relation to form access openings for circumferential welding of the abutting tube ends, welding the abutting tube ends together circumferentially about the junction of the abutting tubes, and seal welding the ends of the corresponding webs to one another including closing the access openings with a metallic filler material.

BACKGROUND AND SUMMARY OF THE INVENTION

The present invention relates to the fabrication and installation of water cooled walls of high capacity steam generators and more particularly to an improved procedure for joining the tubular elements of a superjacent section of a membrane wall to the tubular elements of an axially aligned subjacent membrane wall section during field erection.

When furnace walls are larger in their overall dimensions than fabrication or shipping capabilities can accommodate, they are prefabricated in multiple panel sections for assembly by welding into unitary structures at the construction site. The panels comprise parallel, laterally adjacent tubes having their intertube spaces closed by metallic membranes or webs welded to next adjacent tubes, and thus it becomes necessary to prefabricate the panels so that they can be easily positioned in end abutting relationship with the tubes of the upper and lower panels axially aligned and so that they can be quickly and effectively butt welded together, to form a gas tight enclosing wall with the abutting tubes providing a continuous flow path for containing and conducting fluid at high temperature and pressure.

Heretofore, tubular panels have been formed and butt welded to one another at the panel ends utilizing one of two methods. In one of the methods, the webs and tubes, in planar panel sections, are butt welded together by a continuous weld across both sides of the junction between the abutting panel sections. This method is described in U.S. Pat. 3,154,666.

In the other method, the webs and tubes of each individual panel are fully welded together into a planar panel section except for short end portions of the webs which are bent out of the plane of the panel. Tube ends of the adjoining tube panels are placed in abutting relationship; and the abutting tube ends are aligned and then welded together by circumferential welds. Next, the bent, unwelded web ends are restored to their original position in the plane of the panels, and are welded to their adjoining tubes and also to one another, end to end, in order to close the gap between tubes. This method is more fully described in U.S. Pat. 3,422,517.

While both prior methods will produce a satisfactory jointure, the present invention provides an improved tube panel and method for butt welding same. The method comprises:

(a) providing at one end of a tube panel notches in the webs extending to the associated tube ends;
(b) positioning the notched end of the panel in abutting planar relationship with a second tube panel so that corresponding tubes of the panels are co-axially aligned, and corresponding webs thereof are in opposing relation to form access openings for circumferential welding of abutting tube ends;
(c) welding the abutting tube ends together circumferentially about the junction of the abutting tubes; and
(d) seal welding the ends of the corresponding webs to one another including suitably closing the access openings with metallic filler material.

The present method is superior to the first of the prior methods mentioned because it provides for circumferential welding of each of the individual abutting tubes, a welding method preferred to the continuous type welding method because of the absolute necessity for tube weld integrity. It is superior to the second method in that it requires less time to complete the joining operation, as it is not necessary to manipulate the web end portions and does not require field welding the end portions of the webs to adjoining tubes.

DESCRIPTION OF THE PREFERRED EMBODIMENTS OF THE INVENTION

Figure 1:
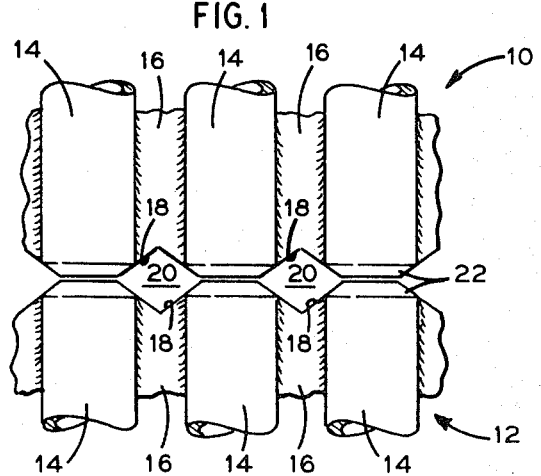
FIG. 1 is a fragmentary view of vertically aligned abutting tube panels illustrating a preferred panel construction in accordance with this invention where the tube to tube side spacing is relatively narrow, as in the case of furnace walls.

Shown in FIG. 1 as a portion of a rigid, gas impervious, pressure resistant furnace wall are fragments of vertically aligned upper and lower tube panels 10 and 12, each comprising parallel, laterally adjacent tubes 14, with metallic webs or membranes 16 filling the spaces between and welded to next adjacent tubes.

As shown at 18, notches, extending to the ends of associated tubes 14, are formed at the ends of the webs 16. Being so positioned, the notches 18 permit access to the entire periphery of the tubes 14, at the tube ends.

These notches 18 must be of a size, such that when the panels 10 and 12 are positioned in the abutting relationship shown in the drawing, the access openings 20, formed by and at the junction of the webs 16, are sufficiently large to permit circumferential welding of the axially aligned abutting tubes 14 to one another. If the tube ends are beveled, as at 22, it may not be necessary to notch both panels in order that the access opening 20 be of sufficient size to permit circumferential welding of tube ends. While there is no maximum limitation as to the size of the notches 18, it is practicable to make them no larger than required, since this will aid in the subsequent filling of access openings 20 with metallic material.

It will be realized that while the notches 18 are illustrated as V-like indentations, this shape is not essential; they may be any shape which will form a suitable access opening for welding of the tubes when the panels are positioned in an abutting relationship. Moreover, the notches may be formed by any suitable means, being formed either prior to, during, or subsequent to panel fabrication.

While there is some flexibility in the method of forming the notches 18, it has been found most desirable to form V-like indentations with a scarfing or beveling tool subsequent to the fabrication of the panels and prior to shipment to the construction site. Also it has been found desirable to bevel the tube ends, as at 22, to insure that a full penetration butt weld at the tube ends is obtained during assembly. Furthermore, beveling of the tubes and notching of the webs is most advantageously done at the same time using the same cutting tool, e.g. a suitably shaped scarfing tool, so the edge surface of the V-like notches will have the same inclination as the beveled surfaces 22 of the associated tube ends and merge into these surfaces.

At the construction site, the notched ends of the panels 10 and 12 are positioned as shown in the drawing in an abutting relationship so that corresponding tubes 14 of the panels are in coaxial relation and the corresponding webs 16 and notches 18 thereof are in opposing relation to form access openings 20, and the abutting tubes 14 are circumferentially welded to one another. Because it may not always be possible to fabricate the panels 10 and 12 so that the abutting tubes exactly align, it may in some instances be necessary to split some of the webs 16 lengthwise for a short distance to permit correction for slight misalignment. If these splits are required, they may be made along the axis of the webs 16 with a torch. By making the splits in this manner, it will not be necessary to make any tube to web welds. These splits may be seal welded at the same time the access openings 20 are filled.

The circumferential welding of abutting tubes 14 may be carried out in any suitable manner, however, it has been found desirable to make a heliarc welding pass, followed by electric arc welding to complete the welds, the welds being made in adjoining pairs of abutting tubes by two welders working as a team, one on the inside and the other on the outside of the wall.

Following the tube welding the welds may be inspected and the tubes 14 hydrostatically or otherwise tested. If any rewelding is required, it may be done at this time.

The final step in completing the butt welding of the panels 10 and 12 is the seal welding of the webs 16. This includes the filling of the access openings 20 and also the welding of any splits if such were necessary to facilitate alignment of the tubes 14. Assuming the notches 18 were made no larger than required, the access openings 20 may generally be filled by simply seal welding; if necessary however, a backing plate or an insert may be used.

Figure 2:
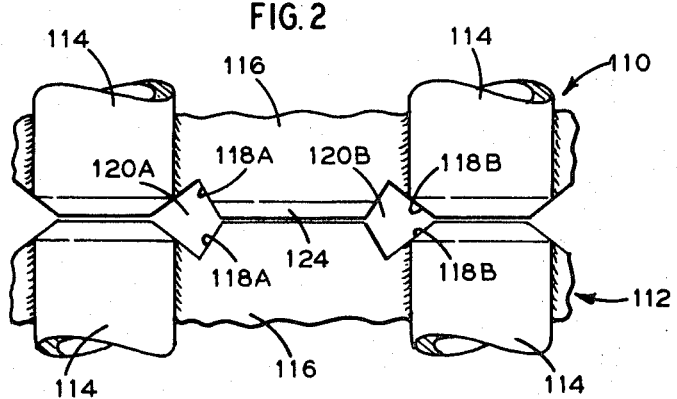
FIG. 2 is also a fragmentary view of vertically aligned abutting tube panels illustrating a preferred panel construction in accordance with this invention where the tube spacing is relatively wide as in the case of convection pass walls.

The foregoing procedure has been found most advantageous when the width of the webs is about 5/8 in. or less. In cases where the webs are wider, e.g. in convection pass walls, it has been found desirable to form panels as illustrated in FIG. 2 with panels 110 and 112 each comprising tubes 114 and webs 116. These panels may be constructed in the same general manner as the panels previously discussed, the only major difference being that two separate notches, i.e. notches 118A and 118B, are formed in the ends of each of the webs 116, each notch extending to its associated tube end. This is the desirable construction when the webs 116 are relatively wide, since the size of the access openings 120A and 120B formed by and at the junction of the webs 116 of the abutting panels 110 and 112 may still be maintained at the minimum necessary for access to weld the abutting tubes.

When this construction is employed, the end of the webs 116 between the two notches 120A and 120B may if desired be beveled as at 124.

Aligning and welding of the abutting tubes 114 is performed in the same general manner as previously described.

After tube weld inspection the abutting ends of webs 116 positioned between the access openings 120A and 120B are seal welded and the access openings 120A and 120B filled as previously described.

What is claimed is:

1. A method of butt welding a pair of tube panels each including parallel, laterally adjacent tubes having their intertube spaces closed by metallic webs, comprising:
   (a) providing at one end of one of the tube panels notches in the webs extending to the associated tube ends;
   (b) positioning the notched end of the panel in abutting planar relationship with the second panel so that corresponding tubes of the panels are in coaxial relation and corresponding webs are in opposing relation to form access openings for circumferential welding of abutting tube ends;
   (c) welding the abutting tube ends together circumferentially about the junction of the abutting tubes; and
   (d) seal welding the ends of the corresponding webs to one another including closing the access openings with a metallic filler material.

2. The method according to claim 1, wherein notches are provided at one end of each of the panels and the notched ends thereof are positioned in abutting relationship.

3. The method according to claim 2 wherein two notches are provided in each of the webs.

4. The method according to claim 2 wherein the tube ends are beveled to insure that a full penetration butt weld is obtained, and wherein the notches provided are formed at the same time the tube ends are beveled so that the edge surfaces of the notches merge into the beveled surfaces of the associated tubes.

References Cited
UNITED STATES PATENTS 3,154,666  10/1964  Lorentz, Jr. _____ 29—486X
3,422,517  1/1969  Profita _____ 29—472.1X JOHN F. CAMPBELL, Primary Examiner R. B. LAZARUS, Assistant Examiner U.S. Cl. X.R.

29—471.1, 482; 285—137